(12) United States Patent
Reynolds

(10) Patent No.: US 11,498,722 B2
(45) Date of Patent: Nov. 15, 2022

(54) ADJUSTABLE PARTITION FOR USE INSIDE STORAGE CONTAINERS PROVIDING SEALED CHAMBERS FOR PRESERVATION AND COMPARTMENTALIZATION OF PRODUCTS

(71) Applicant: Mark Reynolds, Austin, TX (US)

(72) Inventor: Mark Reynolds, Austin, TX (US)

( * ) Notice: Subject to any disclaimer, the term of this patent is extended or adjusted under 35 U.S.C. 154(b) by 0 days.

(21) Appl. No.: 17/061,562

(22) Filed: Oct. 1, 2020

(65) Prior Publication Data
US 2021/0024251 A1 Jan. 28, 2021

Related U.S. Application Data

(63) Continuation of application No. 16/856,852, filed on Apr. 23, 2020, now abandoned.

(60) Provisional application No. 62/838,135, filed on Apr. 24, 2019.

(51) Int. Cl.
*B65D 25/06* (2006.01)
*B65D 25/08* (2006.01)

(52) U.S. Cl.
CPC ............. *B65D 25/06* (2013.01); *B65D 25/08* (2013.01); *B65B 2230/02* (2013.01)

(58) Field of Classification Search
CPC .... B65D 39/00; B65D 39/02; B65D 39/0005; B65D 39/0017; B65D 39/0029; B65D 39/0052; B65D 39/0064; B65D 39/0076
See application file for complete search history.

(56) References Cited

U.S. PATENT DOCUMENTS

| | | | |
|---|---|---|---|
| 1,514,379 A | 11/1924 | Fleischer | |
| 2,828,886 A * | 4/1958 | Thomas | B44D 3/12 220/580 |
| 3,040,897 A | 6/1962 | Holman | |
| 3,924,774 A * | 12/1975 | Donnelly | B65D 43/26 220/580 |
| 4,723,674 A | 2/1988 | Nunes | |
| 5,133,474 A | 7/1992 | Smith et al. | |
| 5,219,091 A | 6/1993 | Paramski | |
| 5,242,077 A | 9/1993 | Smith et al. | |
| 5,249,695 A * | 10/1993 | Luch | B65D 39/00 220/276 |
| 5,339,981 A * | 8/1994 | Kral | B44D 3/12 220/227 |
| 5,402,908 A | 4/1995 | Warden et al. | |
| 5,850,919 A * | 12/1998 | Freed | B65D 83/0481 206/534 |
| 6,245,367 B1 | 6/2001 | Galomb | |
| 6,296,885 B1 | 10/2001 | Robertson | |
| 8,784,917 B2 | 7/2014 | Sebban | |
| 8,936,171 B2 | 1/2015 | Light | |
| 8,960,475 B1 | 2/2015 | Peters et al. | |
| 9,517,865 B2 | 12/2016 | Albers et al. | |

(Continued)

*Primary Examiner* — Andrew T Kirsch
(74) *Attorney, Agent, or Firm* — Scheinberg & Associates, PC; Michael Scheinberg

(57) ABSTRACT

A re-useable partitioning seal used storage containers creates a virtually airtight chambers, to preserve products therein. A disc or differently shaped layer, with flat top and bottom surfaces, is configured to fit against the interior surface of a storage container. A thin, flexible perimeter forming a gasket around the layer, and a handle attached to the layer without fissure or cavity, thereby providing and a single piece, inexpensive re-useable partitioning seal.

17 Claims, 3 Drawing Sheets

(56) References Cited

U.S. PATENT DOCUMENTS

| | | |
|---|---|---|
| 10,173,802 B2 | 1/2019 | Carpenter |
| 2003/0161915 A1 | 8/2003 | Lenahan |
| 2006/0151511 A1 | 7/2006 | Kaposi |
| 2006/0169693 A1 | 8/2006 | Yeung |
| 2007/0215624 A1 | 9/2007 | Smallwood |
| 2008/0190933 A1 | 8/2008 | Bougon |
| 2017/0113830 A1 | 4/2017 | Carpenter |
| 2017/0313482 A1 * | 11/2017 | Herlin .................... A24F 23/00 |

* cited by examiner

ADJUSTABLE PARTITION FOR USE INSIDE STORAGE CONTAINERS PROVIDING SEALED CHAMBERS FOR PRESERVATION AND COMPARTMENTALIZATION OF PRODUCTS

This application is a continuation application of U.S. patent application Ser. No. 16/856,852, filed Apr. 23, 2020, which claims priority from U.S. Prov. Pat. App. 62/838,135, filed Apr. 24, 2019, both of which are hereby incorporated by reference in their entirety.

TECHNICAL FIELD OF THE INVENTION

The invention relates to lids and seals used with containers to keep food and other products fresh. More specifically, the invention relates to seals that are inserted or formed within the interior of a container, to more efficiently seal the products stored therein, improving preservation.

BACKGROUND OF THE INVENTION

Food preservation is an ongoing challenge for organizations and individuals. Current adjustable position lids optimize the internal volume of containers by removing much of the ambient atmosphere from remaining in contact with the stored product. But these mechanisms are expensive, complex, and limited to a single storage area per container. Other internal partitioning solutions strive to create completely airtight seals within storage containers, which is inefficient, expensive, and unnecessary.

Adjustable seals use a variety of mechanisms to insert and secure a lid inside a container to separate excess air from food contents. However, these lids are often intricate and expensive to manufacture, which prohibits their use in many applications. The high cost of these lid assemblies prevents including them affordably with existing storage containers or with pre-packaged foods.

Most current insertable lids do not support more than one lid per container and are not able to partition storage contents. In addition to the significant cost increase of using complex seals, only the single, lower side of these are intended for contact with food and other stored products. The top side, with air valves, moving handles, knobs, and other mechanisms are not practical for food contact, as they become soiled by the stored product, diminishing cleanliness and function.

The size of existing, insertable lids also limits the use of multiple lids per container. Inserting several thick lids takes up a significant portion of the container's available storage. Storing large lids outside the storage container, is inefficient and unsanitary.

Insertable lid-only solutions require complicated mechanisms such as adjustable handles, gears, dials, or knobs for resizing and repositioning, in order to create the seal. These increase the difficulty and time needed to use the lid.

The durability of a plastic assembly with moving parts is limited. Current adjustable lid solutions depend on inexpensive materials to build a complex mechanism that are in constant use and in close proximity to food, waste, cleansers, air, water, and all manner of debris. Use and maintenance of current lids with moving parts causes buildup and wear.

Keeping existing insertable lids clean is an inconvenient, manual process. The moving parts, valves, and grooves require hand washing and delicate care, in spite of the need for lids to remain sanitary in most applications.

Current insertable lids require custom matched lid-and-container pairs, which narrows their scope of compatible containers.

Accordingly, there exists a need for a cost-effective, partitioning seal, optimized to the purpose of improving the preservation of foods and other stored products.

SUMMARY OF THE INVENTION

An object of the invention is to provide an adjustable partition for use inside storage containers providing sealed chambers for preservation and compartmentalization of products.

Embodiments of the present invention comprise a novel partitioning seal article generally including a solid layer with a perimeter gasket and a small handle. The article is fitted to the interior diameter of a storage container, into which it is positioned to the depth of the food or other product stored within. For example, for a cylindrical container, the partition seal may be disk-shaped. A seal is thus created between the product and the ambient atmosphere above, creating a virtually airtight chamber for the product within the container. The outer perimeter of the article is thinner than its center to form a flexible gasket that bends to fit against the inner wall of the container as it is positioned downward toward the product. The perimeter gasket allows air to evacuate as the article is secured in place, creating the virtually airtight seal. It is the objective to remove 99.99% and not 100% of the ambient atmosphere from stored products that allows for the optimal and novel design of the present invention. By "ambient atmosphere" is meant air above the product, not interstitial air within the product. The flat, food-facing, top and bottom surfaces minimize adhesion to stored contents. The single-piece design eases use, improves durability, reduces cost, and optimizes space providing efficient preservation within storage containers.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Some embodiments of the present invention are illustrated as an example and are not limited by the figures of the accompanying images, in which like references may indicate similar and in which.

DETAILED DESCRIPTION OF PREFERRED EMBODIMENTS

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Applicant has found that many insertable partitions seek to create a completely airtight seal, which results in designs that are more complicated, more expensive, and less efficient for this purpose. Preventing the vast majority of ambient atmosphere from remaining in contact with stored products accomplishes the necessary level of preservation and is significantly more efficient to design, manufacture, and use.

New insertable, one-piece articles and methods for positioning and sealing contents of containers are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
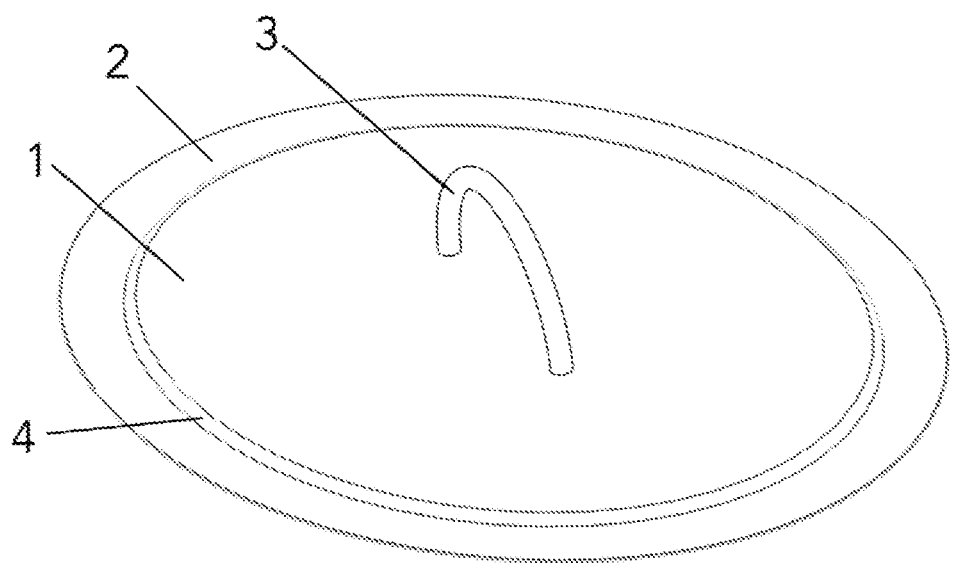
FIG. 1 depicts a standalone perspective view of the article according to various embodiments of the present invention.

Embodiments of the present invention will now be described by referencing the appended figures representing preferred embodiments. FIG. 1 depicts a standalone perspective view of the partitioning seal article (the "article") according to various embodiments of the present invention.

In preferred embodiments, the article consists of a durable, food-safe material configured into a disc 1 with a thin, flexible perimeter 2 and a small handle 3. The article is constructed as a single piece, possibly a molded plastic such as Low-density polyethylene or other BPA-free material, for ease of use, durability, safety, and convenient cleaning. This "solid state" design combines the perimeter gasket 2, the small handle 3, and the disc 1. The surface of the disc 1 is flat and non-textured on both top and bottom, which minimizes the adherence of storage products to the article, whether they contact the article either above or below.

Figure 2:
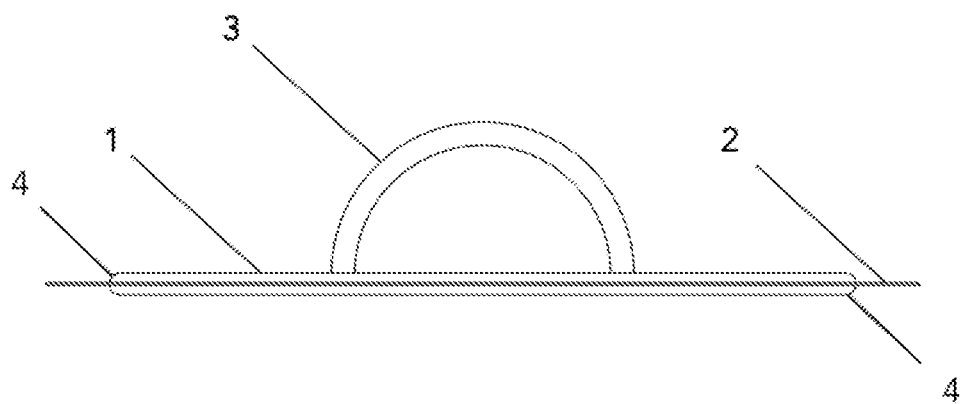
FIG. 2 depicts a side elevation view of the article according to various embodiments of the present invention.

FIG. 2 shows a side elevation view of the article to better indicate the relatively compact height or thickness of the disc 1 and the thinner perimeter gasket 2.

Figure 3:
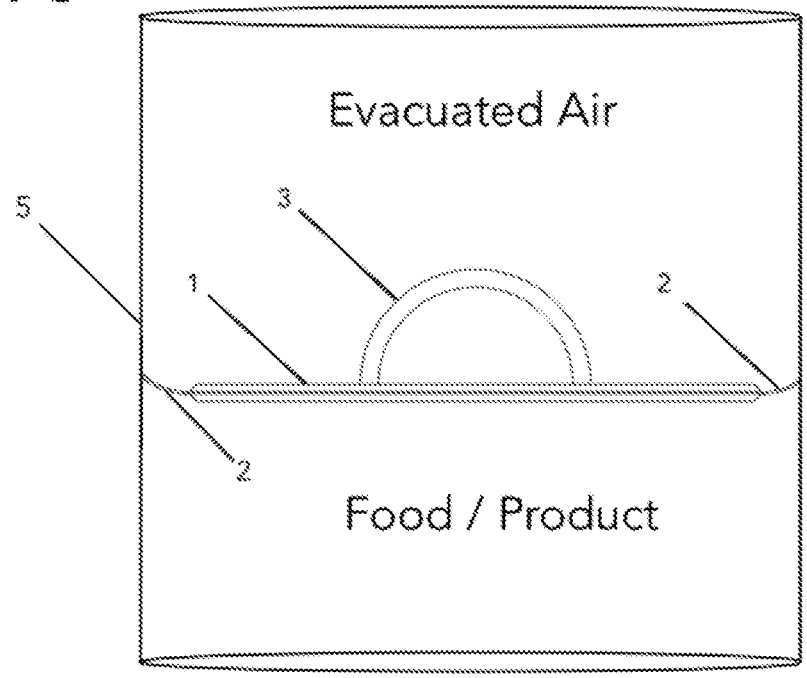
FIG. 3 depicts a perspective view of one example of the article positioned within a storage canister according to various embodiments described herein.

The thinness of the disc 1 at the perimeter 2, provides flexibility to the material, thus forming a perimeter gasket 2 ring around the disc 1. The disk 1, perimeter gasket 2, and handle 3, can be formed as a single part, possibly using injection molded plastic, to provide cost-effective and durable construction. Reducing the thickness of disc 1 at its perimeter 2 leverages the flexibility of the material to create a functional gasket. The thicker, center disc 1 area maintains its shape, while the thinner perimeter 2 area is flexible. FIG. 3 shows the article is sized to fit the interior wall 5 of a storage container, so the thinner area forming the perimeter gasket 2, flexes firmly in place to form a partitioning seal. The storage container is commonly a cylindrical canister, though other container shapes such as rectangular boxes also work well. The diameter of the partitioning seal is slightly larger than the inner diameter of the storage container. For other shapes, the dimension of the partitioning seal is slightly larger than the corresponding dimension of the container. The article's perimeter gasket 2 is sufficiently thin to flex against the interior wall 5 of the storage container, allowing the article to move along the internal wall of the container and air to escape as it is being moved into position. After positioning against the stored product, the article separates the product from the ambient atmosphere above, creating a partitioned, sealed chamber. While the entire disk is formed from a single piece of material, the center portion of the disk is thick enough to be rigid, whereas the edge is sufficiently thin to be flexible.

The thickness of the perimeter area is calculated based on the stiffness of the material used, for example Low-density polyethylene (LDPE) and also the size of the lid. In the case of an embodiment of the article constructed of LDPE and measuring 120 mm in diameter, the perimeter gasket would measure 10 mm in width and 0.25 mm in thickness. In the same embodiment the 100 mm center disc is constructed with a thickness of 3 mm, providing the stiffness for this area to maintain its shape as the thinner perimeter flexes. This 12 to 1 thickness ratio of disc center area to disc perimeter area, provides a general baseline proportion for calculating disc measurements of additional embodiment sizes.

FIG. 3 shows the flexible perimeter gasket 2 in position over the stored product inside a container 5. In this way, almost the entire volume of ambient atmosphere inside the container 5 has been separated from the stored product. A virtual seal that is 99.99% airtight is efficiently created and preserves the stored products. The remaining 0.01% of ambient air trapped in the lower chamber or that may enter via the gasket is negligible and enables the design to be optimized for ease of use and cost-effective manufacturing, without the dependence on complex and expensive additions such as valves, knobs, and bulbs. For example, the virtual seal is sufficiently airtight could keep food fresh for anywhere from 1 month, 3 months, 6 months, or a year, depending on the application.

Figure 4:
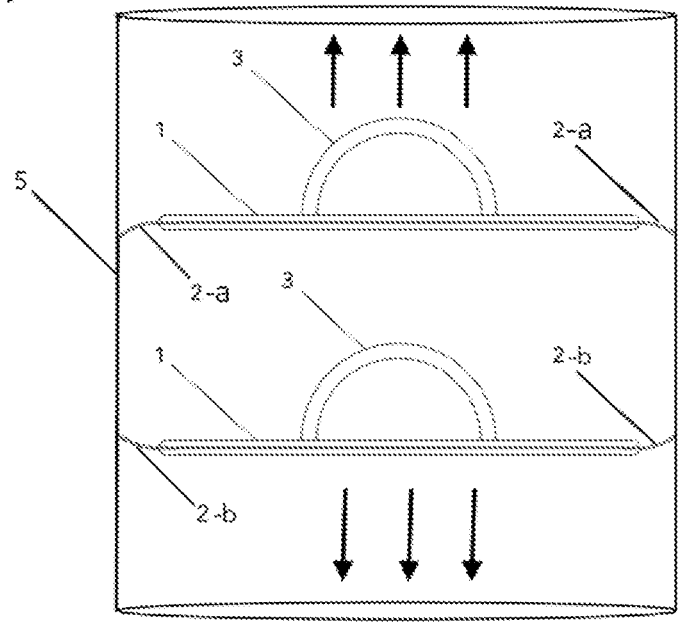
FIG. 4 depicts a perspective view of one example of two articles being positioned into a storage canister according to various embodiments described herein.

FIG. 4 shows how the perimeter gasket 2-*b* flexes upward as the article is positioned downward into the storage container 4. The flexibility of the perimeter gasket 2-*b* allows the article to firmly maintain contact with the interior wall of the storage container 5 while moving downward into position. Conversely in FIG. 4, the perimeter gasket 2-*a* flexes downward as the article is moved upward and out of the storage container 5. The flexibility of the perimeter gasket allows air to evacuate when inserting the article and air to re-enter the storage partition when removing the article. Further, the tension and firm fit of the perimeter gasket 2-*b* against the storage container wall 5 after it has been placed in position, provides a virtually airtight seal of the chamber below.

Figure 5:
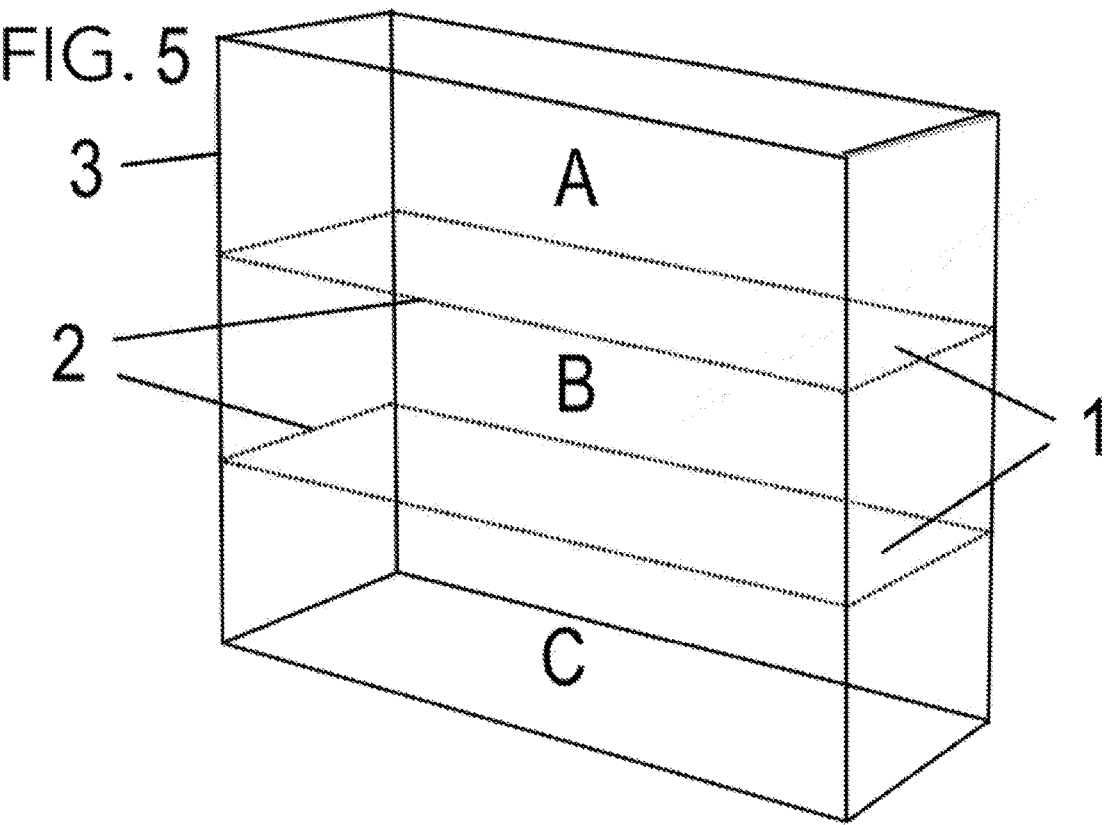
FIG. 5 depicts a perspective view of a prepackaged foods embodiment of a seal with breakaway perimeter, partitioning the package into multiple chambers.

FIG. 5 depicts a second embodiment of the article 1 as a partitioning seal, made of plastic film, wax paper, or other material, in a pre-packaged food container 3. Similarly taking advantage of the inexpensive and easy to use design, the article 1 separates commercially packaged, shipped, and stored foods into separate chambers (A, B, C), each chamber being airtight. In this embodiment, the article's 1 perimeter 2 is designed as a perforated, tear away layer, thereby designed to be disposed of along with the packaging it shipped with. The significant benefit of this embodiment is that as the container 3 is opened and the food in the topmost chambers (A & B) is consumed, the food in the lower chambers (B & C) remain unopened and fresh, not having been exposed to air and moisture.

Figure 6:
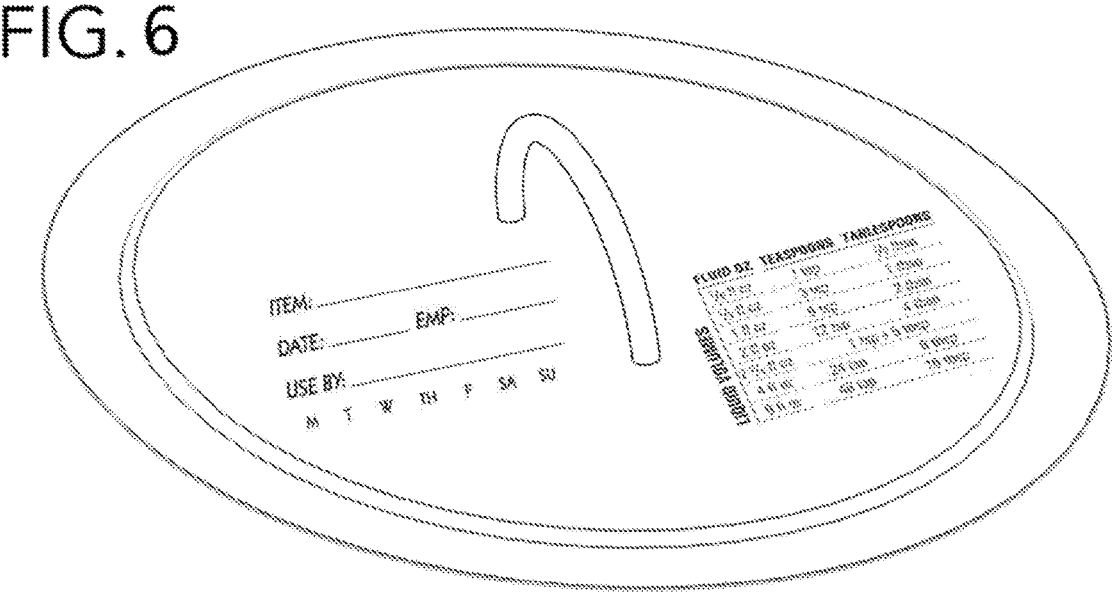
FIG. 6 depicts prototypes of partitioning seals printed with helpful information.

FIG. 6 shows examples of the article printed with helpful information for the consumer. The partitioning seals may be printed with kitchen conversion tables, content expiration dates, or nutritional information.

While food storage and preservation may be the most obvious application of a partitioned seal, many other products and industries also benefit. Chemicals used in agriculture, construction, and medicine also require cost-effective protection from contamination by air, moisture, and debris.

In addition to product freshness, partitioning storage containers allows for accurate portioning of food in recipes, fertilizer for a specific square footage of landscape, chlorine crystals to be added to a pool, detergent to be used in laundry, and many other applications.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A re-useable partitioning seal used with storage containers, creating virtually airtight chambers, to preserve products therein and comprising:

a disk or differently shaped layer, with flat top and bottom surfaces, configured to fit against an interior surface of a storage container, a thin, flexible perimeter forming a gasket around the layer, the thin flexible perimeter being thinner than the center of the disk or differently shaped layer and sufficiently flexible to flex against the interior wall of the storage container; and a handle attached to the layer without fissure or cavity, thereby providing a single piece, re-useable partitioning seal, wherein:

the partitioning seal lacks a valve and the thin flexible perimeter is sufficiently flexible to allow removal without a valve; and the thin flexible perimeter lies flat in the plane of the disk when the re-useable partitioning seal is not bent by the interior walls of the storage container.

2. The re-useable partitioning seal of claim 1 in which the thin, flexible perimeter forming the gasket and the disk are formed as a single part, with the thin flexible perimeter being thinner than the disk.

3. The re-useable partitioning seal of claim 1, in which the partitioning seal comprises a single piece of food grade material.

4. A storage container including multiple re-usable partitioning seals of claim 3.

5. The storage container of claim 4 further comprising:

a first food material between the bottom of the storage container and a first of the multiple re-usable partitioning seals; and a second food material between the top of the first of the multiple re-useable partitioning seals and the bottom of a second one of the multiple re-useable partitioning seals.

6. The re-useable partitioning seal of claim 1 in which the thin, flexible perimeter is configured to flex upward when the re-useable partition seal is pushed downward and to flex equally downward when the re-useable partition seal is pulled upward.

7. The re-useable partitioning seal of claim 1 in which a center portion of the re-useable partitioning seal maintains its shape during insert and removal of the re-useable portioning seal in the storage container, while the thin, flexible perimeter area flexes.

8. The re-useable partitioning seal of claim 7 in which the center portion is about 12 times the thickness of the disk perimeter area.

9. The re-useable partitioning seal of claim 1 in which the thickness of the thin, flexible perimeter is about 0.25 mm.

10. The re-useable partitioning seal of claim 1 in which the top surface of the disk or differently shaped layer is smooth and flat except for the handle.

11. The re-useable partitioning seal of claim 1 in which the top surface of the thin, flexible perimeter and the bottom surface of the thin, flexible perimeter both extend radially to the same extent.

12. The re-useable partitioning seal of claim 1 in which:

the thin flexible perimeter is deflected upward above the plane of the disk when the thin flexible perimeter is being pushed downward into a storage container; and the thin flexible perimeter is deflected downward below the plane of the disk when the thin flexible perimeter is being removed from the storage container.

13. The re-useable partitioning seal of claim 12 in which the extent of the downward deflection and of the upward deflection are approximately equal.

14. The re-useable partitioning seal of claim 1 in which the entire top and bottom surfaces are flat with the exception of a handle on the top surface for removing the re-useable partitioning seal.

15. A partitioning seal for use inside pre-packaged food and other products containers, to preserve contents therein, which is reusable during the consumption of the packaged contents, comprising:
- a flat disk or differently shaped layer, with flat top and bottom surfaces, fitted to the interior of a storage container,
- a thin, flexible perimeter forming a gasket around the layer, the thin, flexible perimeter lying flat in the plane of the disk when the re-useable partitioning seal is not bent by the interior walls of the storage container,
- a fixed position handle with flat surfaces and seamless attachment to the layer, and
- a single piece design, durable enough to function during consumption of the packaged food or other product, wherein the partitioning seal lacks a valve and the thin flexible perimeter is sufficiently flexible to allow removal without a valve.

16. The partitioning seal of claim 15 in which:
the thin flexible perimeter is deflected upward when the thin flexible perimeter is being pushed downward into a storage container;
the thin flexible perimeter is deflected downward when the thin flexible perimeter is being removed from the storage container.

17. The re-useable partitioning seal of claim 16 in which the extent of the downward deflection and of the upward deflection are approximately equal.

\* \* \* \* \*